United States Patent
Matsuki et al.

(10) Patent No.: US 11,414,577 B2
(45) Date of Patent: Aug. 16, 2022

(54) TWO-PART CURABLE URETHANE ADHESIVE COMPOSITION

(71) Applicant: Sika Hamatite Co., LTD., Hiratsuka (JP)

(72) Inventors: Yuichi Matsuki, Hiratsuka (JP); Megumi Abe, Hiratsuka (JP)

(73) Assignee: Sika Hamatite Co., Ltd., Kanagawa (JP)

( * ) Notice: Subject to any disclaimer, the term of this patent is extended or adjusted under 35 U.S.C. 154(b) by 798 days.

(21) Appl. No.: 16/322,874

(22) PCT Filed: Jul. 25, 2017

(86) PCT No.: PCT/JP2017/026813
§ 371 (c)(1),
(2) Date: Feb. 1, 2019

(87) PCT Pub. No.: WO2018/025702
PCT Pub. Date: Feb. 8, 2018

(65) Prior Publication Data
US 2021/0355355 A1 Nov. 18, 2021

(30) Foreign Application Priority Data
Aug. 2, 2016 (JP) .............................. JP2016-152077

(51) Int. Cl.
| | |
|---|---|
| *C09J 175/08* | (2006.01) |
| *C08G 18/12* | (2006.01) |
| *C08G 18/48* | (2006.01) |
| *C08G 18/76* | (2006.01) |
| *C09J 11/06* | (2006.01) |
| *C08G 18/32* | (2006.01) |
| *C08G 18/78* | (2006.01) |
| *C08G 18/80* | (2006.01) |
| *C08G 18/28* | (2006.01) |
| *C09J 175/04* | (2006.01) |

(52) U.S. Cl.
CPC ............ *C09J 175/08* (2013.01); *C08G 18/12* (2013.01); *C08G 18/289* (2013.01); *C08G 18/3206* (2013.01); *C08G 18/4812* (2013.01); *C08G 18/4825* (2013.01); *C08G 18/4829* (2013.01); *C08G 18/4833* (2013.01); *C08G 18/7671* (2013.01); *C08G 18/7831* (2013.01); *C08G 18/809* (2013.01); *C09J 11/06* (2013.01); *C09J 175/04* (2013.01)

(58) Field of Classification Search
CPC ................ C08G 18/12; C08G 18/4812; C08G 18/4825; C08G 18/4829; C08G 18/7671; C08G 18/3206; C08G 18/4833; C08G 18/7831; C08G 18/809; C08G 18/289; C09J 175/08; C09J 175/04; C09J 11/06
See application file for complete search history.

(56) References Cited

U.S. PATENT DOCUMENTS

| | | | |
|---|---|---|---|
| 2013/0255880 A1 | 10/2013 | Mahdi et al. | |
| 2016/0376396 A1* | 12/2016 | Hidaka | C09K 19/3885 528/65 |
| 2017/0260434 A1 | 9/2017 | Matsuki et al. | |
| 2019/0030830 A1 | 1/2019 | Abe et al. | |

FOREIGN PATENT DOCUMENTS

| | | |
|---|---|---|
| EP | 3 406 425 | 11/2018 |
| JP | 2006-316123 | 11/2006 |
| JP | 2014-502644 | 2/2014 |
| JP | 2015-131940 | 7/2015 |
| WO | WO 2012/078331 | 6/2012 |
| WO | WO 2016/080508 | 5/2016 |
| WO | WO 2017/126362 | 7/2017 |

OTHER PUBLICATIONS

European Search Report for European Application No. 17836808.0 dated Aug. 6, 2020, 9 pages, Germany.
International Search Report for International Application No. PCT/JP2017/026813 dated Aug. 29, 2017, 4 pages, Japan.

* cited by examiner

*Primary Examiner* — Patrick D Niland
(74) *Attorney, Agent, or Firm* — Thorpe North & Western

(57) ABSTRACT

The present technology provides a two-part curable urethane adhesive composition including: a main agent (A) containing a urethane prepolymer (a); and a curing agent (B) containing a compound having two or more active hydrogen groups per molecule (b); wherein the compound having active hydrogen groups (b) includes a tri- or higher functional polyol compound with a molecular weight of 1000 or less (b1); and one or both of the main agent (A) and the curing agent (B) further contain a terpene oligomer (x).

19 Claims, No Drawings

TWO-PART CURABLE URETHANE ADHESIVE COMPOSITION

TECHNICAL FIELD

The present technology relates to a two-part curable urethane adhesive composition.

BACKGROUND ART

In recent years, resin materials (for example, olefin-based resins, matrix resins of fiber reinforced plastic (FRP), and the like) have been used for automobile bodies in place of steel plates from the perspective of reducing weight.

Adhesion of such a resin material with a dissimilar material (for example, glass) has been typically performed by flame-treating the resin material and then adhering the flame-treated resin material by using a primer.

However, there has been a problem that primers have an adverse effect on the environment because they contain a large amount of solvent.

For such problems, the present applicant proposes a two-part curable urethane adhesive composition that improves adhesiveness with resin materials without using a primer.

For example, Japan Unexamined Patent Publication No. 2015-131940 describes "a two-part curable urethane adhesive composition including: a main agent containing a urethane prepolymer; and a curing agent containing a compound having two or more active hydrogen groups per molecule; wherein the curing agent contains at least one type of terpene compound selected from the group consisting of a monoterpene; a hydrogenated monoterpene; or a modified monoterpene obtained by hydroxyl modification of the monoterpene or the hydrogenated monoterpene; and an oligomer having from two to six repeating units derived from the monoterpene or the modified monoterpene".

The present inventors studied changing each component in the main agent and the curing agent, and the like in the two-part curable urethane adhesive composition described in Japan Unexamined Patent Publication No. 2015-131940, from the perspective of further improving the adhesiveness, and found that there is a room for improvement in strength, four hours after mixing the main agent and the curing agent (hereinafter referred to as "strength development property") although the composition is excellent in adhesiveness.

SUMMARY

The present technology provides a two-part curable urethane adhesive composition excellent in both a strength development property and adhesiveness.

The present inventors found that a two-part curable urethane adhesive composition containing a tri- or higher functional polyol compound with a molecular weight of 1000 or less provides a good strength development property and adhesiveness.

That is, the present technology provides the following configurations.

(1) A two-part curable urethane adhesive composition including:
a main agent (A) containing a urethane prepolymer (a); and
a curing agent (B) containing a compound having two or more active hydrogen groups per molecule (b);
wherein the compound having active hydrogen groups (b) includes a tri- or higher functional polyol compound with a molecular weight of 1000 or less (b1); and
one or both of the main agent (A) and the curing agent (B) further contain a terpene oligomer (x).

(2) The two-part curable urethane adhesive composition according to (1) described above, wherein a content of the polyol compound (b1) in the compound having active hydrogen groups (b) is from 0.5 mass % to 25.0 mass % of the compound having active hydrogen groups (b).

(3) The two-part curable urethane adhesive composition according to (1) or (2) described above, wherein a hydroxyl value of the polyol compound (b1) is not less than 250 mg KOH/g.

(4) The two-part curable urethane adhesive composition according to any one of (1) to (3) described above, wherein the polyol compound (b1) is a tetra- or higher functional polyol compound with a molecular weight of 1000 or less.

(5) The two-part curable urethane adhesive composition according to any one of (1) to (4) described above, wherein the compound having active hydrogen groups (b) further includes at least one type of polyol compound selected from the group consisting of a bifunctional polyol compound (b2) and a tri- or higher functional polyol compound with a molecular weight greater than 1000 (b3).

(6) The two-part curable urethane adhesive composition according to (5) described above, wherein a total content of the polyol compound (b1) and the at least one type of polyol compound selected from the group consisting of the polyol compound (b2) and the polyol compound (b3) in the compound having active hydrogen groups (b) is not less than 50.0 mass % of the compound having active hydrogen groups (b).

(7) The two-part curable urethane adhesive composition according to any one of (1) to (6) described above, wherein one or both of the main agent (A) and the curing agent (B) further contain a silane compound (y).

(8) The two-part curable urethane adhesive composition according to any one of (1) to (7) described above, wherein the terpene oligomer (x) is at least one type selected from the group consisting of a compound represented by Formula (8), a compound represented by Formula (9), and a compound represented by Formula (10):

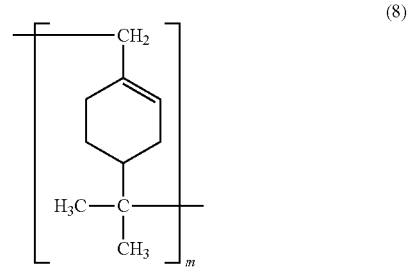

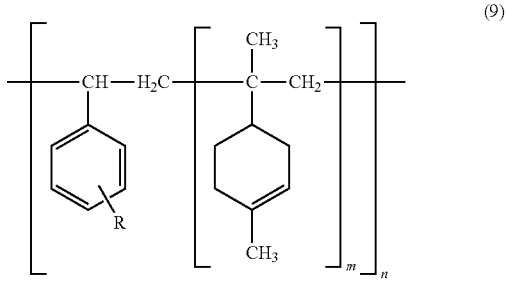

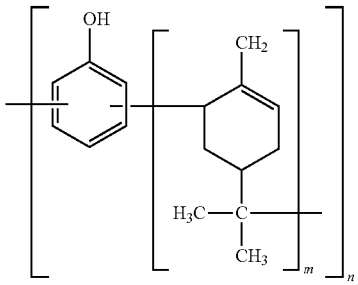

(10)

wherein, in Formulas (8) to (10), m and n are integers and satisfy 2≤m≤6, 1≤n≤3, and 2≤m×n≤6; wherein m×n is a product of m and n; and in Formula (10), R represents a hydrogen atom or an alkyl group having from 1 to 12 carbons.

According to the present technology, there can be provided a two-part curable urethane adhesive composition excellent in both a strength development property and adhesiveness.

DETAILED DESCRIPTION

The two-part curable urethane adhesive composition according to an embodiment of the present technology will be described in detail below.

Note that in the present specification, numerical ranges indicated using "(from) . . . to . . . " means a range including a number before "to" as a lower limit value and a number thereafter as an upper limit value.

Two-Part Curable Urethane Adhesive Composition

A two-part curable urethane adhesive composition of the present technology includes: a main agent (A) containing a urethane prepolymer (a); and a curing agent (B) containing a compound having two or more active hydrogen groups per molecule (b).

Here, the compound having two or more active hydrogen groups per molecule (b) includes a tri- or higher functional polyol compound with a molecular weight of 1000 or less (b1); and one or both of the main agent (A) and the curing agent (B) further contain a terpene oligomer (x).

Because the two-part curable urethane adhesive composition according to an embodiment of the present technology has such a configuration, it is believed to be excellent in both a strength development property and adhesiveness. Although the reason is not clear, it is assumed to be as follows.

As described above, the two-part curable urethane adhesive composition according to an embodiment of the present technology contains a tri- or higher functional polyol compound with a molecular weight of 1000 or less (b1) as a component of the curing agent (B).

Also as described above, the two-part curable urethane adhesive composition according to an embodiment of the present technology contains a terpene oligomer (x) as a component of the main agent (A) and/or a component of the curing agent (B).

Here, the tri- or higher functional polyol compound with a molecular weight of 1000 or less (b1), because of its high reaction rate with the urethane prepolymer (a) contained as a component of the main agent, increases the curing rate of the two-part curable urethane adhesive composition according to an embodiment of the present technology.

In addition, the terpene oligomer contained as a component of the main agent (A) and/or a component of the curing agent (B) contributes to adhesiveness with dissimilar materials, particularly resins. Thus, the two-part curable urethane adhesive composition according to an embodiment of the present technology is believed to be excellent in both a strength development property and adhesiveness.

This can be presumed from the facts that, as shown by the comparative examples described later, in the cases where the tri- or higher functional polyol compound with a molecular weight of 1000 or less (b1) is not contained as a component of the curing agent (B) (Comparative Examples 1 and 3), the strength development property is not sufficient, and in the cases where the terpene oligomer (x) is not contained as a component in the main agent (A) or the curing agent (B) (Comparative Examples 2 and 3), adhesiveness is not sufficient.

Components of Main Agent (A)

The main agent (A) of the two-part curable urethane adhesive composition according to an embodiment of the present technology contains a urethane prepolymer (a).

In addition, the main agent (A) preferably contains the terpene oligomer (x), and the main agent (A) contains the terpene oligomer (x) in a case where the curing agent (B) described later does not contain the terpene oligomer (x).

Urethane Prepolymer (a)

The urethane prepolymer (a) contained in the main agent of the two-part curable urethane adhesive composition according to an embodiment of the present technology is a polymer containing a plurality of isocyanate groups at a molecular terminal per molecule.

As such a urethane prepolymer (a), a known urethane prepolymer can be used. For example, a reaction product, obtained by reacting a polyisocyanate compound and a compound having two or more active hydrogen groups per molecule (hereinafter abbreviated as "active hydrogen compound") in a manner that the amount of the isocyanate groups is in excess relative to the amount of the active hydrogen groups and the like can be used.

Note that the equivalence ratio of the isocyanate groups to the active hydrogen groups (NCO groups/active hydrogen groups) is preferably from 1.2 to 2.2, more preferably from 1.3 to 2.0, and still more preferably from 1.5 to 1.8.

Polyisocyanate Compound

The polyisocyanate compound used in producing the urethane prepolymer (a) is not particularly limited as long as it is a compound having two or more isocyanate groups per molecule.

Examples of the polyisocyanate compound specifically include aromatic polyisocyanates such as TDIs (for example, 2,4-tolylene diisocyanate (2,4-TDI) and 2,6-tolylene diisocyanate (2,6-TDI)), MDIs (for example, 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates such as pentamethylene diisocyanate (PDI), hexamethylene diisocyanate (HDI), trimethylhexamethylene diisocyanate (TMHDI), lysine diisocyanate, and norbornane diisocyanate (NBDI); alicyclic polyisocyanates such as transcyclohexane-1,4-diisocyanate, isophorone diisocyanate (IPDI), bis(isocyanatemethyl)cyclohexane ($H_6XDI$), and dicyclohexylmethane diisocyanate ($H_{12}MDI$); carbodiimide-modified polyisocyanates thereof; and isocyanurate-modified polyisocyanates thereof.

In an embodiment of the present technology, one type of such polyisocyanate compounds may be used alone, or two or more types thereof may be used in combination.

The polyisocyanate compound is preferably an aromatic polyisocyanate, more preferably a TDI or an MDI, and still more preferably an MDI for the reason of excellent curability.

Active Hydrogen Compound

The active hydrogen compound having two or more active hydrogen groups per molecule used in producing the urethane prepolymer (a) is not particularly limited.

Examples of the active hydrogen compound suitably include polyol compounds having two or more hydroxy (OH) groups per molecule, and polyamine compounds having two or more amino groups and/or imino groups per molecule. The active hydrogen compound is preferably a polyol compound.

The polyol compound is not particularly limited with respect to its molecular weight, backbone, and the like as long as the polyol compound has two or more OH groups, and specific examples thereof include low molecular weight polyhydric alcohols, polyether polyols, polyester polyols, other polyols, and polyol mixtures thereof.

Examples of the low molecular weight polyhydric alcohols specifically include low molecular weight polyols such as ethylene glycol (EG), diethylene glycol, propylene glycol (PG), dipropylene glycol, (1,3- or 1,4-)butanediol, pentanediol, neopentyl glycol, hexanediol, cyclohexanedimethanol, glycerin, 1,1,1-trimethylolpropane (TMP), 1,2,5-hexanetriol, and pentaerythritol; and saccharides such as sorbitol.

As the polyether polyols and polyester polyols, compounds derived from the low molecular weight polyhydric alcohols are typically used, but in an embodiment of the present technology, compounds derived from aromatic diols, amines, and alkanolamines described below may also be suitably used.

Here, examples of the aromatic diols specifically include aromatic diols such as resorcin (m-dihydroxybenzene), xylylene glycol, 1,4-benzene dimethanol, styrene glycol, and 4,4'-dihydroxyethyl phenol; and aromatic diols having a bisphenol backbone such as a bisphenol A structure (4,4'-dihydroxyphenylpropane; BPA), a bisphenol F structure (4,4'-dihydroxyphenylmethane; BPF), a brominated bisphenol A structure (TBPA), a hydrogenated bisphenol A structure (HBPA), a bisphenol S structure (BPS), or a bisphenol AF structure (BFAF) as shown below.

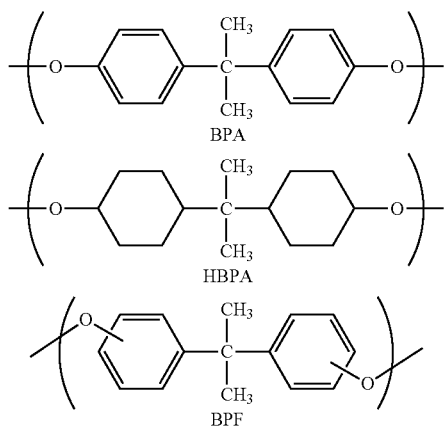

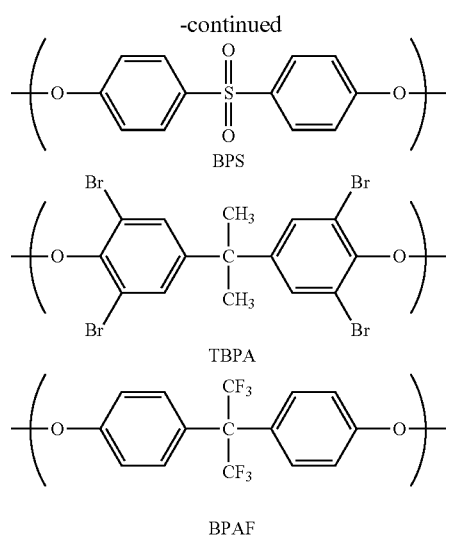

In addition, examples of the amines specifically include ethylenediamine, and hexamethylenediamine, and specific examples of the alkanolamines include ethanolamine, and propanolamine.

Examples of the polyether polyols include polyols and the like obtained by adding at least one type selected from alkylene oxides such as ethylene oxide, propylene oxide, butylene oxide (tetramethylene oxide), and tetrahydrofuran; styrene oxide; and the like; to at least one type selected from the compounds exemplified as the low molecular weight polyhydric alcohols, the aromatic diols, the amines, and the alkanolamines.

Specific examples of such a polyether polyol include polyethylene glycol (PEG), polypropylene glycol (PPG), polypropylene triol, ethylene oxide/propylene oxide copolymers, polytetramethylene ether glycol (PTMEG), polytetraethylene glycol, and sorbitol-based polyols.

Likewise, examples of the polyester polyols include condensation products (condensed polyester polyols) of any of the low molecular weight polyhydric alcohols, the aromatic diols, the amines, and the alkanolamines with a polybasic carboxylic acid; lactone-based polyols; and polycarbonate polyols.

Here, examples of the polybasic carboxylic acid used to form the condensed polyester polyol specifically include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low molecular weight carboxylic acid, oligomeric acid, castor oil, and hydroxycarboxylic acid such as a reaction product of castor oil and ethylene glycol (or propylene glycol).

In addition, examples of the lactone-based polyols specifically include compounds obtained by ring-opening polymerization of a lactone such as ε-caprolactone, α-methyl-ε-caprolactone, or ε-methyl-ε-caprolactone with a suitable polymerization initiator, the compounds having hydroxyl groups at both terminals.

Examples of other polyols specifically include acrylic polyols; polybutadiene diols; and polymer polyols having carbon-carbon bonds of hydrogenated polybutadiene polyols and the like as a main chain backbone.

In an embodiment of the present technology, one type of the various polyol compounds exemplified above may be used alone, or two or more types thereof may be used in combination.

The polyol compounds are preferably polyether polyols, more preferably polypropylene glycol or polytetramethylene ether glycol, and still more preferably polypropylene glycol for reasons of the excellent balance between hardness and elongation at break of the two-part curable urethane adhesive composition according to an embodiment of the present technology containing a resulting urethane prepolymer (a) in the main agent, and its excellent cost.

Examples of the polyamine compounds specifically include aliphatic polyamines such as ethylenediamine, propylenediamine, butylenediamine, diethylenetriamine, triethylenetriamine, triethylenetetramine, tetraethylenepentamine, pentaethylenehexamine, hexamethylenediamine, trimethylhexamethylenediamine, 1,2-propanediamine, iminobispropylamine, methyliminobispropylamine, and 1,5-diamino-2-methylpentane (MPMD, available from Du Pont K.K.); aromatic polyamines such as meta-phenylenediamine, ortho-phenylenediamine, para-phenylenediamine, m-xylylenediamine (MXDA), diaminodiphenyl methane, diaminodiphenyl sulfone, and diamino diethyldiphenylmethane; N-aminoethylpiperazine; monoamine having an ether bond in its main chain, such as 3-butoxyisopropylamine; diamines having a polyether backbone, represented by JEFFAMINE EDR148 available from Sun Techno Chemicals Co., Ltd.; alicyclic polyamines such as isophoronediamine, 1,3-bisaminomethylcyclohexane (1,3-BAC, available from Mitsubishi Gas Chemical Company, Inc.), 1-cyclohexylamino-3-aminopropane, and 3-aminomethyl-3, 3,5-trimethyl-cyclohexylamine; diamines having a norbornane backbone, such as norbornanediamine (NBDA, available from Mitsui Chemicals, Inc.); polyamide amines having an amino group at a molecular terminal of the polyamide; 2,5-dimethyl-2,5-hexamethylene diamine, menthenediamine, 1,4-bis(2-amino-2-methylpropyl)piperazine; and JEFFAMINE D230 and JEFFAMINE D400, available from Sun Techno Chemicals Co., Ltd., having polypropylene glycol (PPG) as a backbone.

In an embodiment of the present technology, one type of such polyol compounds may be used alone, or two or more types thereof may be used in combination.

The polyamine compound is preferably a diamine having a polyether backbone (JEFFAMINE) or hexamethylenediamine, and more preferably hexamethylenediamine.

Examples of the urethane prepolymer (a) include a urethane prepolymer obtained by reacting the polyisocyanate compound and the active hydrogen compound described above.

The urethane prepolymer (a) is preferably a urethane prepolymer obtained by reacting the aromatic polyisocyanate and the polyether polyol described above, and more preferably a urethane prepolymer formed by reacting a polyether polyol with a molecular weight of from 500 to 20000 and an aromatic polyisocyanate compound, with 1.5 to 2.5 moles of isocyanate groups being provided from the aromatic isocyanate compound to one mole of hydroxyl groups in the polyether polyol.

In addition, the urethane prepolymer (a) has a number average molecular weight of preferably from 2000 to 15000, and more preferably from 2000 to 10000.

Here, the number average molecular weight is a number average molecular weight measured by gel permeation chromatography (GPC) (polystyrene basis), and for measurement, it is preferred to use both or one of tetrahydrofuran (THF) and N,N-dimethylformamide (DMF) as a mobile phase (eluant, solvent).

Components of Curing Agent (B)

The curing agent (B) of the two-part curable urethane adhesive composition according to an embodiment of the present technology contains a compound having two or more active hydrogen groups per molecule (b).

In addition, the curing agent (B) preferably contains the terpene oligomer (x), and the curing agent (B) contains the terpene oligomer (x) in a case where the main agent (A) described above does not contain the terpene oligomer (x).

Compound Having Two or More Active Hydrogen Groups Per Molecule (b)

The compound having two or more active hydrogen groups per molecule (b) contained in the two-part curable urethane adhesive composition according to an embodiment of the present technology is a component that cures the urethane prepolymer (a) contained in the main agent (A) described above (i.e., the compound (b) is a curing agent component in a narrow sense).

In an embodiment of the present technology, the compound having two or more active hydrogen groups per molecule (b) includes a tri- or higher functional polyol compound with a molecular weight of 1000 or less (b1) (hereinafter it may be simply referred to as "polyol compound (b1)"). Tri- or higher functional polyol compound with molecular weight of 1000 or less (b1)

The tri- or higher functional polyol compound with a molecular weight of 1000 or less (b1) is not particularly limited as long as it is a compound with a molecular weight of 1000 or less and having three or more hydroxyl (OH) groups per molecule.

Examples of the polyol compound (b1) include polyol compounds with a molecular weight of 1000 or less and tri- or higher functionality among the polyol compounds that can be used to form the urethane prepolymer (a).

Specifically, examples of the polyol compound (b1) include low molecular weight polyhydric alcohols, polyether polyols, and polyester polyols with a molecular weight of 1000 or less and tri- or higher functionality.

Examples of the tri- or higher functional low molecular weight polyhydric alcohols with a molecular weight of 1000 or less specifically include pentaol compounds such as glycerin (Mw. 92), 1,1,1-trimethylolpropane (TMP) (Mw. 134), 1,2,5-hexanetriol (Mw. 134), triethanolamine (Mw. 149), pentaerythritol (Mw. 136), arabitol (Mw. 152), xylitol (Mw. 152); and hexaol compounds such as sorbitol (Mw. 182), inositol (Mw. 180).

Examples of the polyether polyols that can be used as the polyol compound (b1) include polyol compounds with a molecular weight of 1000 or less obtained by addition-polymerizing an initiator with at least one type selected from alkylene oxides such as ethylene oxide (EO), propylene oxide (PO), butylene oxide (tetramethylene oxide), and tetrahydrofuran; styrene oxide; and the like.

Here, examples of the initiator include glycerin, trimethylolpropane, triethanolamine, pentaerythritol, ethylenediamine, aromatic diamines, diethylenetriamine, and sorbitol.

Examples of the polyester polyols that can be used as the polyol compound (b1) include compounds with a molecular weight of 1000 or less among the dehydration condensation products (condensed polyester polyols) of tri- or higher functional polycarboxylic acids and polyhydric alcohols.

Examples of the tri- or higher functional polycarboxylic acids include 1,2,3-propanetricarboxylic acid, aconitic acid, and pyromellitic acid.

Examples of the polyhydric alcohol include ethylene glycol, propylene glycol, 1,4-butanediol, and 1,6-hexanediol.

The molecular weight of the polyol compound (b1) is not particularly limited as long as it is 1000 or less, but it is preferably from 100 to 1000, more preferably from 300 to 1000, and still more preferably from 500 to 1000.

Here, the molecular weight is calculated from a molecular formula for those with a molecular formula that can be identified to one, while it is a number average molecular weight measured by gel permeation chromatography (GPC) (polystyrene basis) for those with molecular formulas that cannot be identified to one. For GPC measurement, it is preferred to use both or one of tetrahydrofuran (THF) and N,N-dimethylformamide (DMF) as a mobile phase (eluant, solvent).

The hydroxyl value of the polyol compound (b1) is not particularly limited, but it is preferably not less than 100 mg KOH/g, more preferably not less than 200 mg KOH/g, and still more preferably not less than 250 mg KOH/g because of a high reactivity with the urethane prepolymer (a).

Here, the hydroxyl value is a hydroxyl value measured according to a method to determine hydroxyl value specified in JIS (Japanese Industrial Standard) K 1557-1:2007 (ISO 14900:2001).

The polyol compound (b1) is preferably a tetra- or higher functional polyol compound with a molecular weight greater than 1000.

The polyol compound (b1) is preferably a compound with a molecular weight of 1000 or less among trifunctional or tetrafunctional polyether polyol compounds obtained by addition-polymerizing glycerin, trimethylolpropane, triethanolamine, pentaerythritol, ethylenediamine, or an aromatic diamine with ethylene oxide (EO) or propylene oxide (PO); more preferably a compound with a molecular weight of 1000 or less among tetrafunctional polyether polyol compounds obtained by addition-polymerizing pentaerythritol, ethylenediamine, or an aromatic diamine with ethylene oxide (EO) or propylene oxide (PO); and still more preferably a compound with a molecular weight of 1000 or less among tetrafunctional polyether polyol compounds obtained by addition-polymerizing pentaerythritol, ethylenediamine, or an aromatic diamine with propylene oxide (PO).

The content of the polyol compound (b1) in the compound having active hydrogen groups (b) is not particularly limited, but it is preferably from 0.5 mass % to 25.0 mass % of the compound having active hydrogen groups (b), more preferably from 1.0 mass % to 15.0 mass % of the compound having active hydrogen groups (b), and still more preferably from 2.0 mass % to 10.0 mass % of the compound having active hydrogen groups (b).

In a case where the content of the polyol compound (b1) is within these ranges, the strength development property is improved and workability is not impaired.

Polyol Compound Other Than Polyol Compound (b1)

The compound having two or more active hydrogen groups per molecule (b) preferably further includes a polyol compound other than the polyol compound (b1). Here, examples of the polyol compound other than the polyol compound (b1) include at least one type of polyol compound selected from the group consisting of a bifunctional polyol compound (b2) (hereinafter it may be simply referred to as "polyol compound (b2)") and a tri- or higher functional polyol compound with a molecular weight greater than 1000 (b3) (hereinafter it may be simply referred to as "polyol compound (b3)").

The polyol compound (b2) is not particularly limited as long as it is a compound having two hydroxyl (OH) groups per molecule.

Examples of the polyol compound (b2) include bifunctional polyol compounds among the polyol compounds that can be used to form the urethane prepolymer (a).

The polyol compound (b2) can reduce the curing rate of the adhesive composition because of its lower reactivity with the urethane prepolymer compared with the polyol compound (b1).

The polyol compound (b3) is not particularly limited as long as it is a compound with a molecular weight greater than 1000 and having three or more hydroxyl (OH) groups per molecule.

Examples of the polyol compound (b3) include polyether polyols, and polyester polyols, with a molecular weight greater than 1000 and tri- or higher functionality.

The polyol compound (b3) can reduce the curing rate of the adhesive composition because of its lower reactivity with the urethane prepolymer compared with the polyol compound (b1).

Examples of the polyether polyols that can be used as the polyol compound (b3) include polyol compounds with a molecular weight greater than 1000 obtained by addition-polymerizing an initiator with at least one type selected from alkylene oxides such as ethylene oxide (EO), propylene oxide (PO), butylene oxide (tetramethylene oxide), and tetrahydrofuran; styrene oxide; and the like.

Here, examples of the initiator include glycerin, trimethylolpropane, triethanolamine, pentaerythritol, ethylenediamine, aromatic diamines, diethylenetriamine, and sorbitol.

In addition, examples of the polyester polyols that can be used as the polyol compound (b3) include compounds with a molecular weight greater than 1000 among the dehydration condensation products (condensed polyester polyols) of tri- or higher functional polycarboxylic acids and polyhydric alcohols.

Examples of the tri- or higher functional polycarboxylic acids include 1,2,3-propanetricarboxylic acid, aconitic acid, and pyromellitic acid.

Examples of the polyhydric alcohols include ethylene glycol, propylene glycol, 1,4-butanediol, and 1,6-hexanediol.

The molecular weight of the polyol compound (b3) is not particularly limited as long as it is greater than 1000, but it is preferably from 2000 to 20000, more preferably from 5000 to 15000, and still more preferably from 5000 to 10000.

Here, the molecular weight is calculated from a molecular formula for those with a molecular formula that can be identified to one, while it is a number average molecular weight measured by gel permeation chromatography (GPC) (polystyrene basis) for those with molecular formulas that cannot be identified to one. For GPC measurement, it is preferred to use both or one of tetrahydrofuran (THF) and N,N-dimethylformamide (DMF) as a mobile phase (eluant, solvent).

The total content of the polyol compound (b1) and the at least one type of polyol compound selected from the group consisting of the polyol compound (b2) and the polyol compound (b3) in the compound having active hydrogen groups (b) is not particularly limited, but it is preferably not less than 50.0 mass % of the compound having active hydrogen groups (b), more preferably not less than 75.0 mass % of the compound having active hydrogen groups (b), still more preferably not less than 85.0 mass % of the compound having active hydrogen groups (b), and even still more preferably not less than 90.0 mass % of the compound having active hydrogen groups (b).

Terpene Oligomer (x)

The two-part curable urethane adhesive composition according to an embodiment of the present technology contains a terpene oligomer (x) in either one or both of the main agent (A) and the curing agent (B).

The total content of the terpene oligomer (x) is preferably from 0.5 mass % to 30 mass %, more preferably from 0.5 mass % to 15.0 mass %, and still more preferably from 0.5 mass % to 6.0 mass % with respect to the total of the main agent (A) and the curing agent (B) of the two-part curable urethane adhesive composition according to an embodiment of the present technology.

In a case where both the main agent (A) and the curing agent (B) contain the terpene oligomer (x), the ratio of the content (mass %) of the terpene oligomer (x) in the main agent (A) and the content (mass %) of the terpene oligomer (x) in the curing agent (B) is not particularly limited, but it is preferably from 1:99 to 99:1, more preferably from 10:90 to 90:10, and still more preferably from 20:80 to 80:20.

Terpenes are a series of compounds based on the isoprene rule, in other words, a generic term of compounds represented by a molecular formula $(C_5H_8)_n$.

The terpene oligomer is an oligomer having from two to six repeating units derived from a monoterpene or a modified monoterpene described below, the oligomer having a backbone of a monoterpene and from two to six repeating units represented by a molecular formula $(C_5H_8)_2$. The terpene oligomer may be a homopolymer (homo-oligomer) or a copolymer (co-oligomer).

Compounds represented by a molecular formula $(C_5H_8)_2$ are referred to as monoterpenes.

Examples of the monoterpene include a compound represented by Formula (1) (α-pinene), a compound represented by Formula (2) (β-pinene), a compound represented Formula (3) (limonene), myrcene, carvone, and camphor.

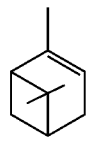
(1)

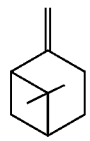
(2)

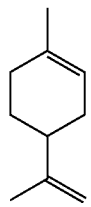
(3)

In addition, a monoterpene obtained by hydroxyl modification of the monoterpene is referred to as a modified monoterpene.

Examples of the modified monoterpene include a compound represented by Formula (5) (α-terpineol), a compound represented by Formula (6) (β-terpineol), and a compound represented by Formula (7) (γ-terpineol).

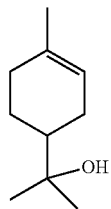
(5)

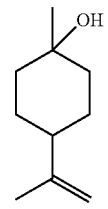
(6)

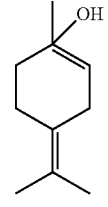
(7)

The terpene oligomer (x) is a compound having from two to six repeating units derived from the monoterpene or the modified monoterpene.

Examples of terpene oligomer (x) include a compound represented by Formula (8) (terpene resin), a compound represented by Formula (9) (aromatic modified terpene resin), and a compound represented by Formula (10) (terpene phenol resin). One type thereof may be used alone or two or more types thereof may be used in combination.

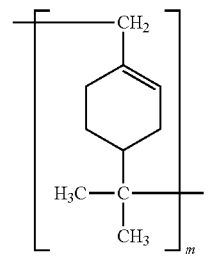
(8)

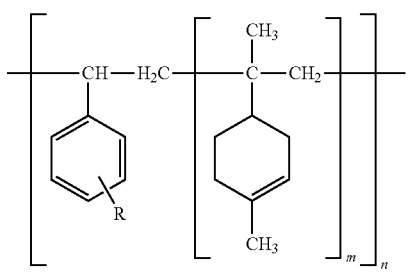
(9)

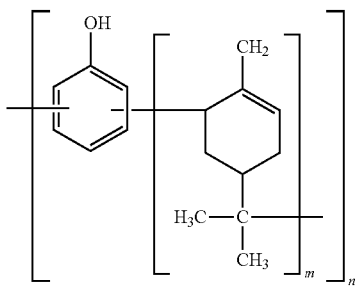

$$(10)$$

In Formulas (8) to (10) above, m and n are integers and satisfy 2≤m≤6, 1≤n≤3, and 2≤m×n≤6; wherein m×n is a product of m and n.

m preferably satisfies 2≤m≤5, and more preferably satisfies 2≤m≤3.

m×n preferably satisfies 2≤m×n≤5, and more preferably satisfies 2≤m×n≤3.

In Formula (9) above, R represents a hydrogen atom or an alkyl group having from 1 to 12 carbons, preferably represents a hydrogen atom or an alkyl group having from 1 to 4 carbons, and more preferably represents a hydrogen atom.

The terpene oligomer is preferably a compound represented by Formulas (8) to (10) above for the reason of having less odor and resulting in good workability.

Silane Compound (y)

The two-part curable urethane adhesive composition according to an embodiment of the present technology may contain a silane compound (y) in either one or both of the main agent (A) and the curing agent (B).

The total content of the silane compound (y) is preferably from 0.03 mass % to 5.0 mass %, more preferably from 0.03 mass % to 2.0 mass %, and still more preferably from 0.03 mass % to 2.0 mass % with respect to the total of the main agent (A) and the curing agent (B) of the two-part curable urethane adhesive composition according to an embodiment of the present technology.

In a case where both the main agent (A) and the curing agent (B) contain the silane compound (y), the ratio between the content (mass %) of the silane compound (y) in the main agent (A) and the content (mass %) of the silane compound (y) in the curing agent (B) is not particularly limited, but it is preferably from 1:99 to 99:1, more preferably from 10:90 to 90:10, and still more preferably from 20:80 to 80:20.

Examples of the silane compound (y) include at least one type selected from the group consisting of silane-modified products of aliphatic isocyanates having one or more alkoxysilyl groups per molecule, mercaptosilane, monosulfide silane, isocyanate silane, and aminosilane oligomers.

Silane-Modified Product of Aliphatic Isocyanate Having One or More Alkoxysilyl Groups per Molecule The silane-modified product of the aliphatic isocyanate having one or more alkoxysilyl groups per molecule is a reaction product of an aliphatic isocyanate compound having one or more alkoxysilyl groups per molecule (hereinafter it may be simply referred to as "aliphatic isocyanate compound") and a secondary aminosilane.

The aliphatic isocyanate compound is preferably an aliphatic isocyanate compound having two or more isocyanate groups per molecule.

Examples of the aliphatic isocyanate compound include diisocyanate compounds such as hexamethylene diisocyanate and pentamethylene diisocyanate, and modified products thereof (for example, a biuret, an isocyanurate, and an allophanate). Among them, an allophanate or a biuret of hexamethylene diisocyanate is preferred.

The secondary aminosilane is not particularly limited as long as it is a compound having an imino group (—NH—) and a hydrolyzable silyl group.

a hydrolyzable group contained in the hydrolyzable silyl group (the hydrolyzable group bonds to a silicon atom) is not particularly limited. Examples of the hydrolyzable group include groups represented by R—O— (R is a hydrocarbon group that may have a hetero atom). Examples of the hydrocarbon group represented by R include alkyl groups, cycloalkyl groups, aryl groups (for example, aryl groups having from 6 to 10 carbons), or combinations thereof. The hydrocarbon group may have a hetero atom such as an oxygen atom, a nitrogen atom, or a sulfur atom. R is preferably an alkyl group, and more preferably an alkyl group having from 1 to 10 carbons. The number of the hydrolyzable group contained in one hydrolyzable silyl group may be one to three. From the perspective of achieving even better adhesiveness, the number of the hydrolyzable group contained in one hydrolyzable silyl group is preferably three.

Examples of the hydrolyzable silyl group include alkoxysilyl groups.

The imino group (—NH—) can bond to the hydrolyzable silyl group via a hydrocarbon group. Examples of the hydrocarbon group include alkyl groups, cycloalkyl groups, aryl groups, or combinations thereof.

The secondary aminosilane may have one or two hydrolyzable silyl groups per molecule.

Examples of the secondary aminosilane having one hydrolyzable silyl group per molecule include 3-(n-butylamino)propyltrimethoxysilane and N-phenyl-γ-aminopropyltrimethoxysilane.

Examples of the secondary aminosilane having two hydrolyzable silyl groups per molecule include N,N-bis[(3-trimethoxysilyl)propyl]amine, N,N-bis[(3-triethoxysilyl)propyl]amine, and N,N-bis[(3-tripropoxysilyl)propyl]amine.

The production of the silane-modified product of the aliphatic isocyanate compound is not particularly limited. Examples thereof include those known. The silane-modified product of the aliphatic isocyanate compound may be each used alone or in combination of two or more types thereof.

The silane-modified product of the aliphatic isocyanate compound may be a mixture including at least two types selected from the group consisting of compounds resulting from a reaction of some of the isocyanate groups contained in the aliphatic isocyanate compound with the secondary aminosilane, and compounds resulting from a reaction of all of the isocyanate groups contained in the aliphatic isocyanate compound with the secondary aminosilane.

In addition, the silane-modified product of the aliphatic isocyanate compound may further include an aliphatic isocyanate compound unreacted with the secondary aminosilane.

Mercaptosilane

Examples of the mercaptosilane include
3-mercaptopropylmethyldimethoxysilane, and 3-mercaptopropyltrimethoxysilane.

Monosulfide Silane

The monosulfide silane is a compound having a monosulfide bond and a hydrolyzable silyl group, and in which the monosulfide bond and a silicon atom contained in the hydrolyzable silyl group bond to each other.

The hydrolyzable group (the hydrolyzable group bonds to a silicon atom) contained in the hydrolyzable silyl group is not particularly limited. Examples of the hydrolyzable group include groups represented by R—O— (R is a hydrocarbon group that may have a hetero atom). Examples of the hydrocarbon group represented by R include alkyl groups, cycloalkyl groups, aryl groups (for example, aryl groups having from 6 to 10 carbons), and combinations thereof. The hydrocarbon group may have a hetero atom such as an oxygen atom, a nitrogen atom, or a sulfur atom. R is preferably an alkyl group, and more preferably an alkyl group having from 1 to 10 carbons. The number of the hydrolyzable group contained in one hydrolyzable silyl group may be from 1 to 3. From the perspective of achieving even better adhesiveness, the number of the hydrolyzable group contained in one hydrolyzable silyl group is preferably three.

Examples of the hydrolyzable silyl group include alkoxysilyl groups.

In a case where the number of the hydrolyzable group contained in one hydrolyzable silyl group is from 1 to 2, the group that can bond to a silicon atom of the hydrolyzable silyl group is not particularly limited. Examples thereof include a hydrocarbon group that may have a heteroatom. Examples of the hydrocarbon group include alkyl groups (for example, alkyl groups having from 1 to 20 carbons), cycloalkyl groups, aryl groups (for example, aryl groups having from 6 to 10 carbons), aralkyl groups (for example, aralkyl groups having from 7 to 10 carbons), alkenyl groups (for example, alkenyl groups having from 2 to 10 carbons), and combinations thereof.

In a case where the hydrocarbon group has a hetero atom, for example, at least one of the carbon atoms in the hydrocarbon group having two or more carbons may be replaced with hetero atom(s) or functional group(s) having a hetero atom (for example, divalent or higher functional group(s)), and/or at least one of the hydrogen atoms in the hydrocarbon group (in this case, the number of carbons is not limited) may be replaced with functional group(s) having a hetero atom (for example, monovalent functional group(s)).

In the monosulfide bond, groups bonded to the monosulfide bond other than the hydrolyzable silyl group are not particularly limited.

From the perspective of achieving even better adhesiveness, one of preferred aspects is that a monosulfide compound further has a second hydrolyzable silyl group in addition to the hydrolyzable silyl group bonding to the monosulfide compound.

The second hydrolyzable silyl group is similar to the hydrolyzable silyl group bonding to the monosulfide bond.

The second hydrolyzable silyl group can bond to the monosulfide bond via a hydrocarbon group. The hydrocarbon group is not particularly limited.

Examples of the hydrocarbon group include alkyl groups (for example, alkyl groups having from 1 to 10 carbons), cycloalkyl groups, aryl groups, or combinations thereof. The hydrocarbon group may be in either a straight or branched chain.

From the perspective of achieving even better adhesiveness, the monosulfide compound is preferably a compound represented by Formula (11).

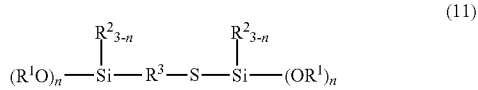

(11)

In Formula (11), $R^1$ and $R^2$ are each independently a hydrocarbon group that may have a hetero atom; n is each independently an integer from 1 to 3; and $R^3$ is a hydrocarbon group.

The hydrocarbon group that may have a hetero atom as R is similar to the hydrocarbon group that an alkoxy group has.

The hydrocarbon group that may have a hetero atom as $R^2$ is similar to the hydrocarbon group that may have a hetero atom as the group that can bond to the silicon atom of the hydrolyzable silyl group in a case where the number of the alkoxy group contained in one hydrolyzable silyl group is from 1 to 2.

n is preferably each independently 3.

The hydrocarbon group as $R^3$ is similar to the hydrocarbon group through which the second hydrolyzable silyl group and the monosulfide bond are bonded. Examples of the hydrocarbon group include —$C_mH_{2m}$—. m is preferably an integer from 1 to 5.

From the perspective of achieving even better adhesiveness, the monosulfide compound is preferably a compound represented by Formula (12).

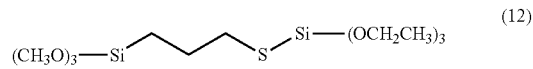

(12)

The method of producing the monosulfide compound is not particularly limited. Examples thereof include known methods such as heating mercaptosilane and tetraalkoxysilane in the presence of an amine-based or a metal-based catalyst and then continuously or discontinuously distilling off resulting alcohol.

The monosulfide compound may be each used alone or in combination of two or more types thereof.

Isocyanate Silane Compound

The isocyanate silane is a compound having an isocyanate group and a hydrolyzable silicon-containing group, for example, it can be obtained by reacting an isocyanate group-containing compound with a compound having a functional group that can react with an isocyanate group and a hydrolyzable silicon-containing group.

Specifically, examples of the isocyanate silane compound suitably include compounds obtained by reacting a diisocyanate such as an MDI, and a TDI with a silane coupling agent such as aminoalkoxysilane, and mercaptoalkoxysilane.

In addition, an isocyanate silane compound obtained by reacting an isocyanate group-containing compound and a silane coupling agent having an imino group in which a phenyl group or the derivative thereof is directly bonded to a nitrogen atom described in JP 2002-53798 A is also suitably used. Here, the isocyanate group-containing compound is preferably an alicyclic polyisocyanate or an alicyclic polyisocyanate. Furthermore, the isocyanate silane compound is preferably obtained by reacting the isocyanate group-containing compound and the silane coupling agent in a reaction ratio of NCO/NH=3/1 to 3/2.

Aminosilane Oligomer

The aminosilane oligomers are an oligomerized compound resulting from self-condensation of an aminosilane compound.

The degree of polymerization of the oligomer is not particularly limited, but it is preferably from 3 to 10, more preferably from 3 to 8, and still more preferably from 4 to 8.

As the aminosilane compound, typically those used as an aminosilane-based coupling agent can be utilized. Examples of the aminosilane compound include a compound represented by Formula (13).

$$\underset{H}{\overset{R^1}{N}}\diagdown\diagup\underset{\underset{(OR^3)_m}{|}}{\overset{|}{Si}}{-}R^2{}_{3-m} \quad (13)$$

In Formula (13), $R^1$ is a straight or branched chain hydrocarbon group having from 1 to 12 carbons. In addition, $R^2$ and $R^3$ are each independently a straight or branched chain hydrocarbon group having from 1 to 12 carbons. m is an integer from 1 to 3.

m in Formula (13) above is an integer from 1 to 3. In other words, only at least one alkoxy group, a substituent bonding to the silicon atom, needs to be present. Thus, all may be alkoxy groups, one may be an alkyl group and two may be alkoxy groups, or one may be an alkoxy group and two may be alkyl groups. This alkoxy group has hydrolyzability. m is preferably 2 or 3. With such a silyl group, development of adhesiveness is rapid.

The aminosilane compound more preferably includes a compound represented by Formula (14).

$$\diagup\diagdown\underset{H}{N}\diagdown\diagup\underset{|}{Si}{-}(OCH_3)_3 \quad (14)$$

A specific example of the aminosilane compound having a configuration represented by Formula (14) above includes Silquest A-Link 15 available from Momentive Performance Materials Inc.

Other Components

The two-part curable urethane adhesive composition according to an embodiment of the present technology may contain in either one or both of the main agent and the curing agent, various additives, as necessary in a range not impairing the object of the present technology, such as fillers, curing catalysts, plasticizers, anti-aging agents, antioxidants, pigments (dyes), thixotropic agents, UV absorbents, flame retardants, surfactants (including leveling agents), dispersants, dehydrating agents, adhesion promoters, and antistatic agents.

Filler

Examples of the fillers include organic or inorganic fillers in various forms. Specifically, examples thereof include fumed silica, calcined silica, precipitated silica, pulverized silica, molten silica; diatomaceous earth; iron oxide, zinc oxide, titanium oxide, barium oxide, and magnesium oxide; calcium carbonate, heavy calcium carbonate, sedimentary calcium carbonate (light calcium carbonate), colloidal calcium carbonate, magnesium carbonate, and zinc carbonate; pyrophyllite clay, kaolin clay, and calcined clay; carbon black; fatty acid treated products, resin acid treated products, urethane compound treated products, and fatty acid ester treated products thereof. One type thereof may be used alone, or two or more types thereof may be used in combination.

Curing Catalyst

The curing catalysts are not particularly limited, but specifically, examples thereof include carboxylic acids such as 2-ethylhexanoic acid and oleic acid; phosphoric acids such as polyphosphoric acids, ethyl acid phosphate, and butyl acid phosphate; bismuth catalysts such as bismuth octylate; tin catalysts such as dibutyltin dilaurate and dioctyltin dilaurate; and tertiary amine catalysts such as 1,4-diazabicyclo[2.2.2]octane and 2,4,6-tris(dimethylaminomethyl)phenol (for example, DMP-30).

Plasticizer

Examples of the plasticizers specifically include diisononyl phthalate (DINP); dioctyl adipate and isodecyl succinate; diethylene glycol dibenzoate, pentaerythritol ester; butyl oleate and methyl acetyl ricinoleate; tricresyl phosphate and trioctyl phosphate; and propylene glycol adipate polyester and butylene glycol adipate polyester. One type thereof may be used alone, or two or more types thereof may be used in combination.

Anti-Aging Agent

Examples of the anti-aging agents specifically include compounds such as hindered phenol compounds.

Antioxidant

Examples of the antioxidants specifically include butylhydroxytoluene (BHT), and butylhydroxyanisole (BHA).

Pigment

Examples of the pigments specifically include inorganic pigments such as titanium oxide, zinc oxide, ultramarine, iron red, lithopone, lead, cadmium, iron, cobalt, aluminum, hydrochlorides, and sulfates; and organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigment, and carbon black.

Thixotropic Agent

Examples of the thixotropic agents specifically include AEROSIL (available from Nippon Aerosil Co., Ltd.), and DISPARLON (available from Kusumoto Chemicals, Ltd.).

Adhesion Promoter

Examples of the adhesion promoters specifically include phenol resins, rosin resins, and xylene resins.

Flame Retardant

Examples of the flame retardants specifically include chloroalkyl phosphates, dimethyl-methyl phosphates, bromine-phosphorus compounds, ammonium polyphosphates, neopentyl bromide-polyethers, and brominated polyethers.

Antistatic Agent

Examples of the antistatic agents specifically include quaternary ammonium salts; hydrophilic compounds such as polyglycols, and ethylene oxide derivatives.

The two-part curable urethane adhesive composition according to an embodiment of the present technology has an excellent strength development property and adhesiveness as described above. Thus, it stably exhibits excellent performance to adherends composed of dissimilar materials such as metal and glass, glass and resin, and resin and metal without using a primer composition. In particular, because the two-part curable urethane adhesive composition according to an embodiment of the present technology is excellent in a strength development property, it is useful for adhering dissimilar materials in automobile production lines and the like.

The method of producing the two-part curable urethane adhesive composition according to an embodiment of the present technology is not particularly limited. For example, the composition can be prepared by a method of sufficiently mixing separately in a nitrogen gas atmosphere:

a main agent (A) containing a urethane prepolymer (a) and terpene oligomer (x); and a curing agent (B) containing:

a compound having two or more active hydrogen groups per molecule (b) including a tri- or higher functional polyol compound with a molecular weight of 1000 or less (b1), and a terpene oligomer (x).

In addition, in an embodiment of the present technology, the prepared agents can be separately charged and stored in separate containers; the main agent in a container the inner atmosphere of which is replaced with nitrogen gas and the like, and the curing agent in another container. The main agent and the curing agent can be also sufficiently mixed to prepare the adhesion composition at the time of use.

EXAMPLES

The present technology will be specifically described below with reference to examples. However, the present technology is not limited thereto.

Synthesis of Urethane Prepolymer (a-1)

First, 200 g of polypropylene ether triol with a number average molecular weight of 5000 (G-5000, trade name "EXCENOL 5030", available from Asahi Glass Co., Ltd.) and 600 g of polypropylene ether diol with a number average molecular weight of 2000 (D-2000, trade name "EXCENOL 2020", available from Asahi Glass Co., Ltd.) were charged into a flask, heated to 100° C. to 130° C., and stirred while degassed to dehydrate until the moisture content was 0.01% or less. The mixture was then cooled to 90° C., diphenylmethane diisocyanate (MDI, trade name "Sumidule 44S", available from Sumika Bayer Urethane Co., Ltd.) was added in an amount of 162 g, the amount giving a molar ratio of NCO groups/OH groups of 1.80, and then the reaction was run for about 24 hours in a nitrogen atmosphere to synthesize a urethane prepolymer (a-1) with an NCO content of 2.5%.

Synthesis of Silane Compound (y-1)

A silan compound (y-1) was obtained by mixing 47.2 g of 3-(N-phenyl)aminopropyltrimethoxysilane (secondary aminosilane) and 100 g of a biuret of hexamethylene diisocyanate (HDI) (Takenate D-165N, available from Mitsui Chemicals, Inc.; an isocyanate compound having three isocyanate groups per molecule on average) (at this time, the molar ratio of NCO/NH was 3), and reacting them in a nitrogen atmosphere at 80° C. for 6 hours.

The resulting silane compound (y-1) was a mixture, among three isocyanate groups contained in the isocyanate compound, at least containing a compound resulting from a reaction of one isocyanate group with the NH group of the secondary aminosilane; a compound resulting from a reaction of two isocyanate groups with the NH group of the secondary aminosilane; a compound resulting from a reaction of three isocyanate groups with the NH group of the secondary aminosilane; and an unreacted isocyanate compound.

Example 1 and Comparative Examples 1 to 3

Each component of the main agent and the curing agent shown in Table 1 described below was compounded in a compounded amount (parts by mass) shown in the same table, and uniformly mixed in a mixer (5 L level) while degassed for about 1 hour to prepare the main agent shown in Table 1. The compounded amount (parts by mass) of each component in the main agent and the curing agent is shown in Table 1.

The prepared main agent and curing agent were mixed in a mass ratio of the main agent:the curing agent=10:1 to obtain an adhesive composition.

Each resulting adhesive composition was evaluated for adhesiveness by the methods described below. The results are shown in Table 1.

Strength Development Property

An adherend obtained by flame-treating one side of a glass plate (width 25 mm, length 120 mm, thickness 3 mm), and an adherend obtained by flame-treating one side of a resin plate (PBT; width 25 mm, length 120 mm, thickness 3 mm) were prepared.

An adherend obtained by flame-treating one side of a glass plate (width 25 mm, length 120 mm, thickness 3 mm), and an adherend obtained by flame-treating one side of a metal plate (steel plate; width 25 mm, length 120 mm, thickness 3 mm) were prepared.

An adherend obtained by flame-treating one side of a metal plate (steel plate; width 25 mm, length 120 mm, thickness 3 mm), and an adherend obtained by flame-treating one side of a resin plate (PBT; width 25 mm, length 120 mm, thickness 3 mm were prepared.

After the flame treatment, the adherends were checked that the wettability on the surface of the resin was not less than 45.0 mN/m, using a wetting tension test mixture (available from Wako Pure Chemical Industries, Ltd.).

Each adhesive composition immediately after the preparation (mixing) was then coated to a surface of one adherend (the flame-treated side) so as to give a thickness of 3 mm. Thereafter, the coated surface was adhered to a surface of another adherend (the flame-treated side) and compression-bonded to prepare a test sample.

That is, testing pairs were prepared in three combinations: a combination of the glass plate and the resin plate, a combination of the glass plate and the metal plate, and a combination of the metal plate and the resin plate.

The prepared test sample was allowed to stand in conditions of 23° C., relative humidity of 50% for 4 hours, and then the tensile test in accordance with JIS K 6850:1999 was performed at 23° C. to measure the shear strength (MPa) at a tensile speed of 50 mm/min.

As a result of measurement, the shear strength not less than 2.1 MPa was rated "A", the shear strength not less than 1.0 MPa and less than 2.1 MPa was rated "B", and the shear strength less than 1.0 MPa was rated "D".

Adhesiveness

Test samples were prepared in a way similar to the test of the strength development property.

Initial Adhesion

The prepared test sample was allowed to stand in conditions of 23° C., relative humidity of 50% for 72 hours, and then the tensile test in accordance with JIS K 6850:1999 was performed at 23° C. to evaluate by the following criteria.

Evaluation Criteria

A: A test sample with cohesive failure in the adhesive was rated "CF", and a test sample with CF not less than 95% when a failure state was visually observed.

B: A test sample with CF not less than 90% and less than 95% when a failure state was visually observed.

C: A test sample with CF not less than 50% and less than 90% when a failure state was visually observed.

D: A test sample with interfacial failure between the adherend and the adhesive was rated "AF", and a test sample with AF not less than 50% when failure state was visually observed.

Cooling and Heating Cycle

The prepared test sample was allowed to stand in an environment of 23° C., relative humidity of 50% for 72 hours, then a cooling and heating cycle of −30° C. for 24 hours and 80° C. for 24 hours were repeated 10 cycles, and the failure state was evaluated in a way similar to the test of initial adhesion. The evaluation criteria were the same criteria as to the test of initial adhesion.

TABLE 1-1

|  |  |  | Example 1 | Example 2 | Example 3 |
|---|---|---|---|---|---|
| Main agent (A) |  | Urethane prepolymer (a-1) | 40 | 40 | 40 |
|  |  | Terpene oligomer (x-1) | 1 | 1 | 1 |
|  |  | Silane compound (y-1) | 1 | 1 | 1 |
|  |  | Silane compound (y-2) | — | 0.1 | 0.1 |
|  |  | Carbon black | 20 | 20 | 20 |
|  |  | Calcium carbonate 1 | 22 | 22 | 22 |
|  |  | Plasticizer | 15 | 15 | 15 |
|  |  | Curing catalyst | 1 | 1 | 1 |
| Curing agent (B) |  | Polyol compound (b1-1) | 3 | 3 | 10 |
|  |  | Terpene oligomer (x-2) | 2 | 2 | 2 |
|  |  | Silane compound (y-3) | 1 | 1 | 1 |
|  |  | Polyol compound (b3-1) | 60 | 60 | 52 |
|  |  | Calcium carbonate 2 | 30 | 30 | 30 |
|  |  | Silica | 3 | 3 | 3 |
|  |  | Curing catalyst | 1 | 1 | 1 |
| Strength development property and adhesiveness | Glass plate × resin plate (PBT) | Strength development property (strength after 4 hours) | B | B | A |
|  |  | Adhesiveness (initial adhesion) | B | A | A |
|  |  | Adhesiveness (cooling and heating cycle) | B | A | A |
|  | Glass plate × metal plate (steel plate) | Strength development property (strength after 4 hours) | B | B | A |
|  |  | Adhesiveness (initial adhesion) | B | A | A |
|  |  | Adhesiveness (cooling and heating cycle) | B | A | A |
|  | Metal plate (steel plate) × resin plate (PBT) | Strength development property (strength after 4 hours) | B | B | A |
|  |  | Adhesiveness (initial adhesion) | B | A | A |
|  |  | Adhesiveness (cooling and heating cycle) | B | A | A |

TABLE 1-2

|  |  | Comparative Example 1 | Comparative Example 2 | Comparative Example 3 |
|---|---|---|---|---|
| Main agent (A) | Urethane prepolymer (a-1) | 40 | 40 | 40 |
|  | Terpene oligomer (x-1) | 1 | — | — |
|  | Silane compound (y-1) | 1 | 1 | 1 |
|  | Silane compound (y-2) | — | — | — |
|  | Carbon black | 20 | 20 | 20 |
|  | Calcium carbonate 1 | 22 | 22 | 22 |
|  | Plasticizer | 15 | 15 | 15 |
|  | Curing catalyst | 1 | 1 | 1 |
| Curing agent (B) | Polyol compound (b1-1) | — | 3 | — |
|  | Terpene oligomer (x-2) | 2 | — | — |
|  | Silane compound (y-3) | 1 | 1 | 1 |
|  | Polyol compound (b3-1) | 65 | 60 | 65 |
|  | Calcium carbonate 2 | 30 | 30 | 30 |
|  | Silica | 3 | 3 | 3 |
|  | Curing catalyst | 1 | 1 | 1 |

TABLE 1-2-continued

|  |  |  | Comparative Example 1 | Comparative Example 2 | Comparative Example 3 |
|---|---|---|---|---|---|
| Strength development property and adhesiveness | Glass plate × resin plate (PBT) | Strength development property (strength after 4 hours) | D | B | D |
|  |  | Adhesiveness (initial adhesion) | B | D | D |
|  |  | Adhesiveness (cooling and heating cycle) | C | D | D |
|  | Glass plate × metal plate (steel plate) | Strength development property (strength after 4 hours) | D | B | D |
|  |  | Adhesiveness (initial adhesion) | B | C | B |
|  |  | Adhesiveness (cooling and heating cycle) | B | D | D |
|  | Metal plate (steel plate) × resin plate (PBT) | Strength development property (strength after 4 hours) | D | B | D |
|  |  | Adhesiveness (initial adhesion) | B | D | D |
|  |  | Adhesiveness (cooling and heating cycle) | B | D | D |

Components of Main Agent (A)

The details of each component shown in "Main agent (A)" in Table 1 above are as follows.

Urethane prepolymer (a-1): The resulting urethane prepolymer as described above

Terpene oligomer (x-1): YS Resin-CP (available from Yasuhara Chemical Co., Ltd.)

Silane compound (y-1): An equimolar reaction product of a biuret of hexamethylene diisocyanate (HDI) and 3-(N-phenyl)aminopropyltrimethoxysilane (a silane-modified product of the aliphatic isocyanate having one or more alkoxysilyl groups per molecule obtained as described above)

Silane compound (y-2): A monosulfide silane represented by Formula (12)

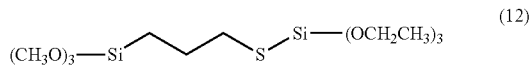

(12)

Carbon black: Trade name #200 MP (available from NSCC Carbon Co., Ltd.)

Calcium carbonate 1: Heavy calcium carbonate, trade name Super S (available from Maruo Calcium Co., Ltd.)

Plasticizer: Diisononyl phthalate (available from J-PLUS Co., Ltd.)

Curing catalyst: Dimorpholinodiethyl ether (available from San-Apro Ltd.)

Components of Curing Agent (B)

The details of each component shown in "Curing agent (B)" in Table 1 above are as follows.

Polyol compound (b1-1): EXCENOL 450ED (available from Asahi Glass Co., Ltd.; molecular weight 500; hydroxyl value 450 mg KOH/g; tetrafunctional polyether polyol)

Terpene oligomer (x-2): Dimerone (available from Yasuhara Chemical Co., Ltd.)

Silane compound (y-3): X12-972F (available from Shin-Etsu Chemical Co., Ltd.)

Polyol compound (b3-1): PREMINOL 7001K (available from Asahi Glass Co., Ltd.; molecular weight 6000; hydroxyl value 29 mg KOH/g; trifunctional polyether polyol)

Calcium carbonate 2: KALFAIN 200 (available from Maruo Calcium Co., Ltd.)

Silica: REOLOSIL QS-102 (available from Tokuyama Corporation)

Curing catalyst: Dimorpholinodiethyl ether (available from San-Apro Ltd.)

Explanation of Results

Examples 1 to 3

Examples 1 to 3 exhibited an excellent strength development property and excellent adhesiveness to dissimilar materials without using a primer.

Example 2 utilizing, as silane compounds, the combination of the silane-modified product of the aliphatic isocyanate having one or more alkoxysilyl groups per molecule (silane compound (y-1)) and the monosulfide silane (silane compound (y-2)) exhibited even better adhesiveness than Example 1.

Example 3, in which the amount of the tri- or higher functional polyol compound with a molecular weight of 1000 or less (polyol compound (b1-1)) was increased to change the amount of the polyol compound (b1-1) in the polyol compound in the curing agent (B) from 4.8 mass % to 16.1 mass %, exhibited an even better strength development property than Example 2.

Comparative Example 1

Comparative Example 1 is an example containing no tri- or higher functional polyol compound with a molecular weight of 1000 or less (polyol compound (b1-1)). Comparative Example 1 resulted in an inferior strength development property. Adhesiveness was generally good, but the rating of cooling and heating cycle adhesiveness slightly low for the combination of the glass plate and the resin plate.

Comparative Example 2

Comparative Example 2 is an example containing no terpene oligomers (x-1, x-2). Comparative Example 2 resulted in an excellent strength development property, but poor adhesiveness except the initial adhesiveness in the combination of the glass plate and the metal plate.

Comparative Example 3

Comparative Example 3 is an example containing neither tri- or higher functional polyol compound with a molecular weight of 1000 or less (polyol compound (b1-1)) nor the terpene oligomers (x-1, x-2). Comparative Example 3 resulted in an inferior strength development property. Comparative Example 3 resulted in poor adhesiveness except initial adhesiveness in the combination of the glass plate and the metal plate.

Overall

As described above, it is obvious from the results shown in Table 1 that the object of the present technology cannot be achieved in a case where either one of a tri- or higher functional polyol compound with a molecular weight of 1000 or less or a terpene oligomer is not contained.

The invention claimed is:

1. A two-part curable urethane adhesive composition comprising:
   a main agent (A) containing a urethane prepolymer (a); and
   a curing agent (B) containing a compound having two or more active hydrogen groups per molecule (b);
   wherein the compound having active hydrogen groups (b) comprises a tri- or higher functional polyol compound with a molecular weight of 1000 or less (b1); and
   one or both of the main agent (A) and the curing agent (B) further contain a terpene oligomer (x).

2. The two-part curable urethane adhesive composition according to claim 1, wherein a content of the polyol compound (b1) in the compound having active hydrogen groups (b) is from 0.5 mass % to 25.0 mass % of the compound having active hydrogen groups (b).

3. The two-part curable urethane adhesive composition according to claim 1, wherein a hydroxyl value of the polyol compound (b1) is not less than 250 mg KOH/g.

4. The two-part curable urethane adhesive composition according to claim 1, wherein the polyol compound (b1) is a tetra- or higher functional polyol compound with a molecular weight of 1000 or less.

5. The two-part curable urethane adhesive composition according to claim 1, wherein the compound having active hydrogen groups (b) further comprises at least one type of polyol compound selected from the group consisting of a bifunctional polyol compound (b2) and a tri- or higher functional polyol compound with a molecular weight greater than 1000 (b3).

6. The two-part curable urethane adhesive composition according to claim 5, wherein a total content of the polyol compound (b1) and the at least one type of polyol compound selected from the group consisting of the polyol compound (b2) and the polyol compound (b3) in the compound having active hydrogen groups (b) is not less than 50.0 mass % of the compound having active hydrogen groups (b).

7. The two-part curable urethane adhesive composition according to claim 1, wherein one or both of the main agent (A) and the curing agent (B) further contain a silane compound (y).

8. The two-part curable urethane adhesive composition according to claim 1, wherein the terpene oligomer (x) is at least one type selected from the group consisting of a compound represented by Formula (8), a compound represented by Formula (9), and a compound represented by Formula (10):

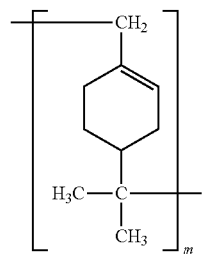

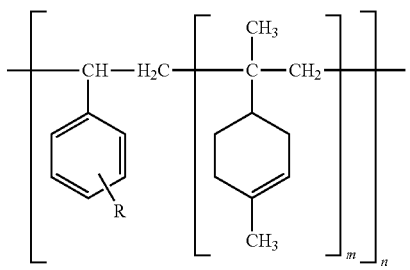

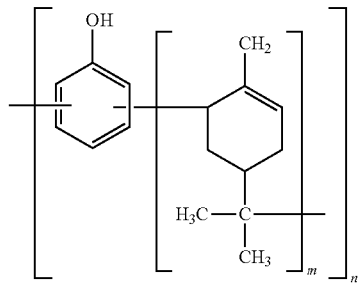

wherein, in Formulas (8) to (10), m is an integer satisfying $2 \leq m \leq 6$; n is an integer satisfying $1 \leq n \leq 3$; a product of m and n, m×n, satisfies $2 \leq m \times n \leq 6$; and in Formula (10), R represents a hydrogen atom or an alkyl group having from 1 to 12 carbons.

9. The two-part curable urethane adhesive composition according to claim 2, wherein a hydroxyl value of the polyol compound (b1) is not less than 250 mg KOH/g.

10. The two-part curable urethane adhesive composition according to claim 2, wherein the polyol compound (b1) is a tetra- or higher functional polyol compound with a molecular weight of 1000 or less.

11. The two-part curable urethane adhesive composition according to claim 2, wherein the compound having active hydrogen groups (b) further comprises at least one type of polyol compound selected from the group consisting of a bifunctional polyol compound (b2) and a tri- or higher functional polyol compound with a molecular weight greater than 1000 (b3).

12. The two-part curable urethane adhesive composition according to claim 11, wherein a total content of the polyol compound (b1) and the at least one type of polyol compound selected from the group consisting of the polyol compound (b2) and the polyol compound (b3) in the compound having active hydrogen groups (b) is not less than 50.0 mass % of the compound having active hydrogen groups (b).

13. The two-part curable urethane adhesive composition according to claim 2, wherein one or both of the main agent (A) and the curing agent (B) further contain a silane compound (y).

14. The two-part curable urethane adhesive composition according to claim 2, wherein the terpene oligomer (x) is at least one type selected from the group consisting of a compound represented by Formula (8), a compound represented by Formula (9), and a compound represented by Formula (10):

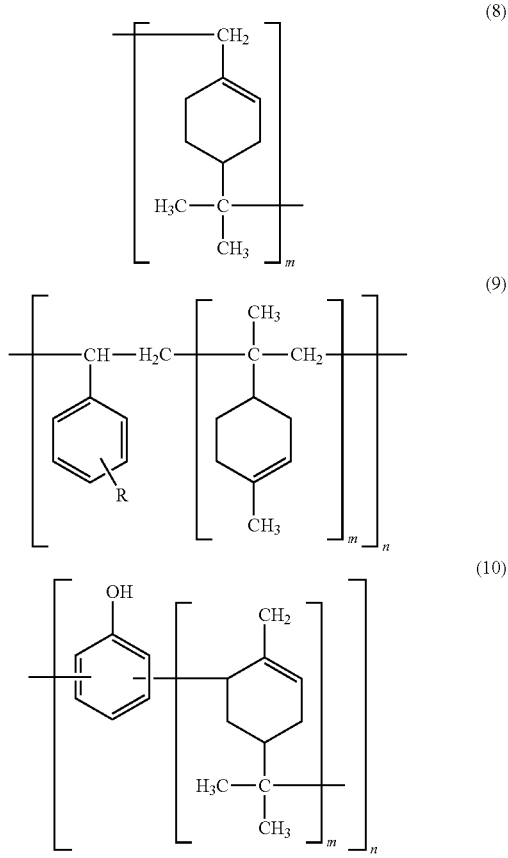

wherein, in Formulas (8) to (10), m is an integer satisfying 2≤m≤6; n is an integer satisfying 1≤n≤3; a product of m and n, m×n, satisfies 2≤m×n≤6; and in Formula (10), R represents a hydrogen atom or an alkyl group having from 1 to 12 carbons.

15. The two-part curable urethane adhesive composition according to claim 3, wherein the polyol compound (b1) is a tetra- or higher functional polyol compound with a molecular weight of 1000 or less.

16. The two-part curable urethane adhesive composition according to claim 3, wherein the compound having active hydrogen groups (b) further comprises at least one type of polyol compound selected from the group consisting of a bifunctional polyol compound (b2) and a tri- or higher functional polyol compound with a molecular weight greater than 1000 (b3).

17. The two-part curable urethane adhesive composition according to claim 16, wherein a total content of the polyol compound (b1) and the at least one type of polyol compound selected from the group consisting of the polyol compound (b2) and the polyol compound (b3) in the compound having active hydrogen groups (b) is not less than 50.0 mass % of the compound having active hydrogen groups (b).

18. The two-part curable urethane adhesive composition according to claim 3, wherein one or both of the main agent (A) and the curing agent (B) further contain a silane compound (y).

19. The two-part curable urethane adhesive composition according to claim 3, wherein the terpene oligomer (x) is at least one type selected from the group consisting of a compound represented by Formula (8), a compound represented by Formula (9), and a compound represented by Formula (10):

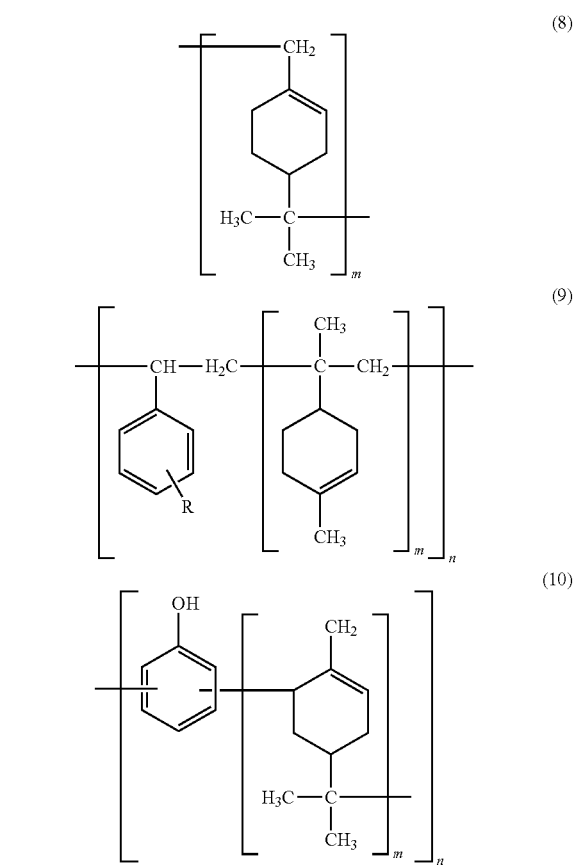

wherein, in Formulas (8) to (10), m is an integer satisfying 2≤m≤6; n is an integer satisfying 1≤n≤3; a product of m and n, m×n, satisfies 2≤m×n≤6; and in Formula (10), R represents a hydrogen atom or an alkyl group having from 1 to 12 carbons.

* * * * *